(12) United States Patent
Sagata

(10) Patent No.: US 8,011,353 B2
(45) Date of Patent: Sep. 6, 2011

(54) BLOW-BY GAS RECIRCULATION STRUCTURE FOR ENGINE

(75) Inventor: Munehiro Sagata, Toyoake (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 449 days.

(21) Appl. No.: 12/270,136

(22) Filed: Nov. 13, 2008

(65) Prior Publication Data

US 2009/0205619 A1 Aug. 20, 2009

(30) Foreign Application Priority Data

Feb. 18, 2008 (JP) ................................ 2008-036625

(51) Int. Cl.
*F01M 13/00* (2006.01)
*F01M 9/00* (2006.01)
(52) U.S. Cl. ..................................... 123/572; 123/90.27
(58) Field of Classification Search .......... 123/572–574, 123/41.86, 90.27
See application file for complete search history.

(56) References Cited

U.S. PATENT DOCUMENTS

| | | | | |
|---|---|---|---|---|
| 5,123,385 A | * | 6/1992 | Sado et al. | 123/193.5 |
| 2004/0159314 A1 | * | 8/2004 | Ishizuka et al. | 123/572 |
| 2005/0092267 A1 | * | 5/2005 | Nonaka et al. | 123/41.86 |

FOREIGN PATENT DOCUMENTS

| | | |
|---|---|---|
| EP | 1447533 B1 | 8/2006 |
| JP | S59-7247 U | 1/1984 |
| JP | 01-088012 U | 6/1989 |
| JP | H06-8714 U | 2/1994 |
| JP | 08-254113 A | 10/1996 |
| JP | 2006-207437 A | 8/2006 |

OTHER PUBLICATIONS

Extended European Search Report dated Dec. 8, 2010 for the corresponding European Application No. 08020637.8.

* cited by examiner

*Primary Examiner* — M. McMahon
(74) *Attorney, Agent, or Firm* — Global IP Counselors, LLP

(57) ABSTRACT

A blow-by gas recirculation structure for an engine includes a gas-liquid separating member, a cylinder head, a support member and a mounting bolt. The gas-liquid separating member includes a gas-liquid separating passage to separate oil from the blow-by gas. The cylinder head includes a communication passage communicating with the air intake system. The support member is configured and arranged to rotatably support a camshaft in the cylinder head. The mounting bolt securely fastens the support member to the cylinder head with the mounting bolt threadedly engaging within the communication passage of the cylinder head. The mounting bolt has an axial through hole axially extending there-through and communicating with the gas-liquid separating passage so that the blow-by gas that has passed through the gas-liquid separating passage is recirculated from the axial through hole of the mounting bolt, through the communication passage, and into the air intake system.

18 Claims, 15 Drawing Sheets

BLOW-BY GAS RECIRCULATION STRUCTURE FOR ENGINE

CROSS-REFERENCE TO RELATED APPLICATIONS

This application claims priority to Japanese Patent Application No. 2008-036625, filed on Feb. 18, 2008. The entire disclosure of Japanese Patent Application No. 2008-036625 is hereby incorporated herein by reference.

BACKGROUND OF THE INVENTION

1. Field of the Invention

The present invention relates to a blow-by gas recirculation structure configured and arranged to recirculate blow-by gas, and an internal combustion engine equipped with the blow-by gas recirculation structure.

2. Background Information

Japanese Laid-Open Utility Model Publication No. 06-8714 discloses a blow-by gas recirculation structure in which a partitioning wall is provided inside a cylinder head cover of an engine so as to form a blow-by gas expansion chamber and an intake chamber for drawing blow-by gas from the expansion chamber into intake ports of the engine.

In such a blow-by gas recirculation structure, a communication passage is formed within the partitioning wall of the cylinder head cover to enable communication between the expansion chamber and the intake chamber, thereby enabling blow-by gas to be recirculated from a crankcase to the intake ports without the use of external piping.

In view of the above, it will be apparent to those skilled in the art from this disclosure that there exists a need for an improved blow-by gas recirculation structure. This invention addresses this need in the art as well as other needs, which will become apparent to those skilled in the art from this disclosure.

SUMMARY OF THE INVENTION

With the blow-by gas recirculation structure described in the above mentioned reference, it is necessary to form the communication passages within the partitioning wall of the cylinder head cover to distribute the blow-by gas to the intake ports. Since the thickness of the partitioning wall is generally small, some difficulty is associated with forming these communication passages. Although a solution would be to making the partitioning wall thicker, doing so would result in increases in size and weight of the cylinder head cover.

Accordingly, one object of the present invention is to provide a simple way to secure a structure for recirculating blow-by gas. The present invention at least partially achieves this object by providing a blow-by gas recirculation structure for an engine adapted to recirculate a blow-by gas to an air intake system of the engine with the blow-by gas recirculation structure including a gas-liquid separating member, a cylinder head, a support member and a mounting bolt. The gas-liquid separating member includes a gas-liquid separating passage configured and arranged to separate oil from the blow-by gas. The cylinder head is configured and arranged to rotatably support a camshaft. The cylinder head includes a communication passage communicating with the air intake system. The support member is configured and arranged to rotatably support the camshaft in the cylinder head. The mounting bolt securely fastens the support member to the cylinder head with the mounting bolt threadedly engaging within the communication passage of the cylinder head. The mounting bolt has an axial through hole axially extending there-through and communicating with the gas-liquid separating passage so that the blow-by gas that has passed through the gas-liquid separating passage is recirculated from the axial through hole of the mounting bolt, through the communication passage, and into the air intake system.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
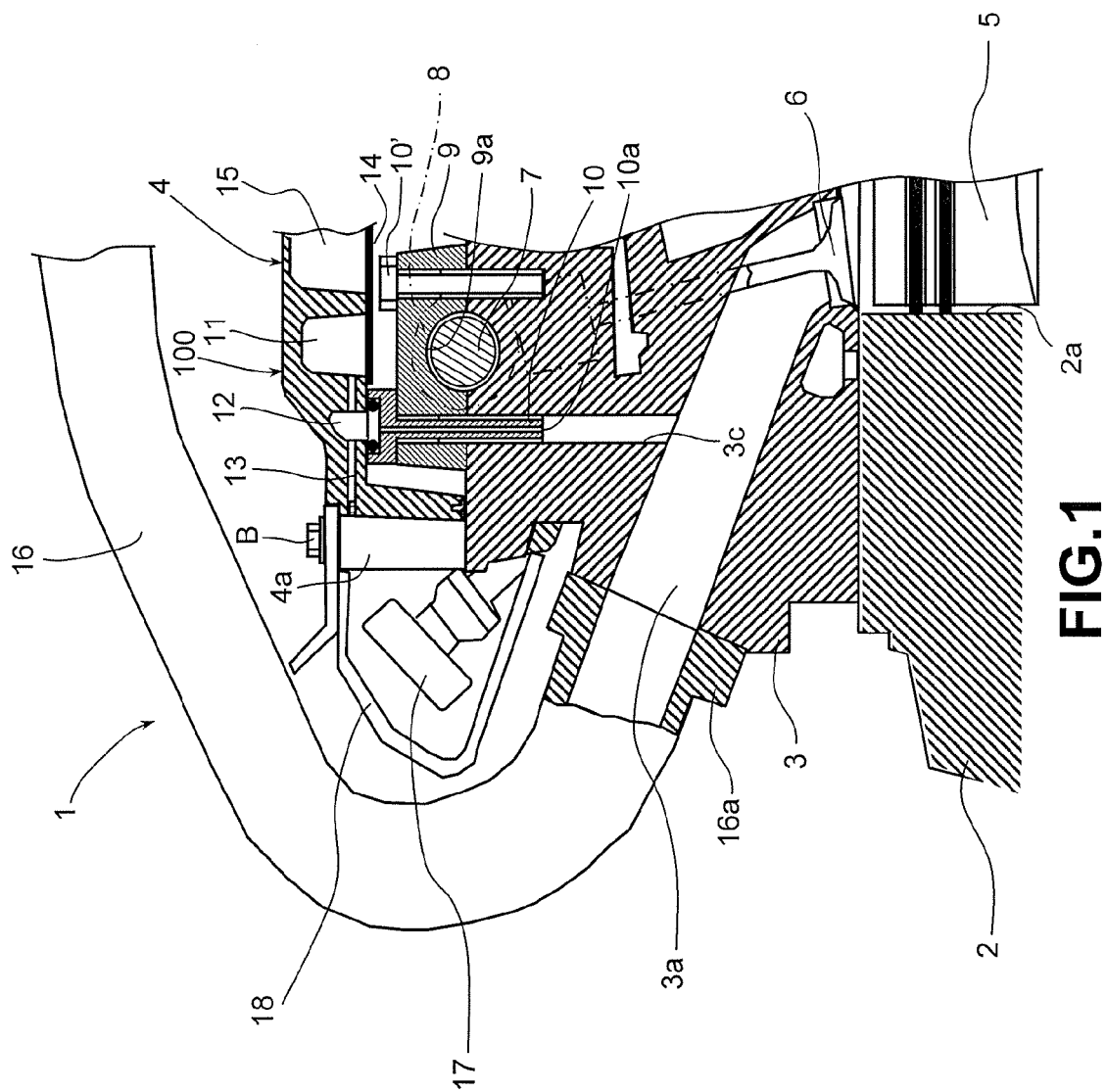
FIG. 1 is a partial vertical cross sectional view of an internal combustion engine including a blow-by gas recirculation structure in accordance with a first embodiment of the present invention.
Figure 2:
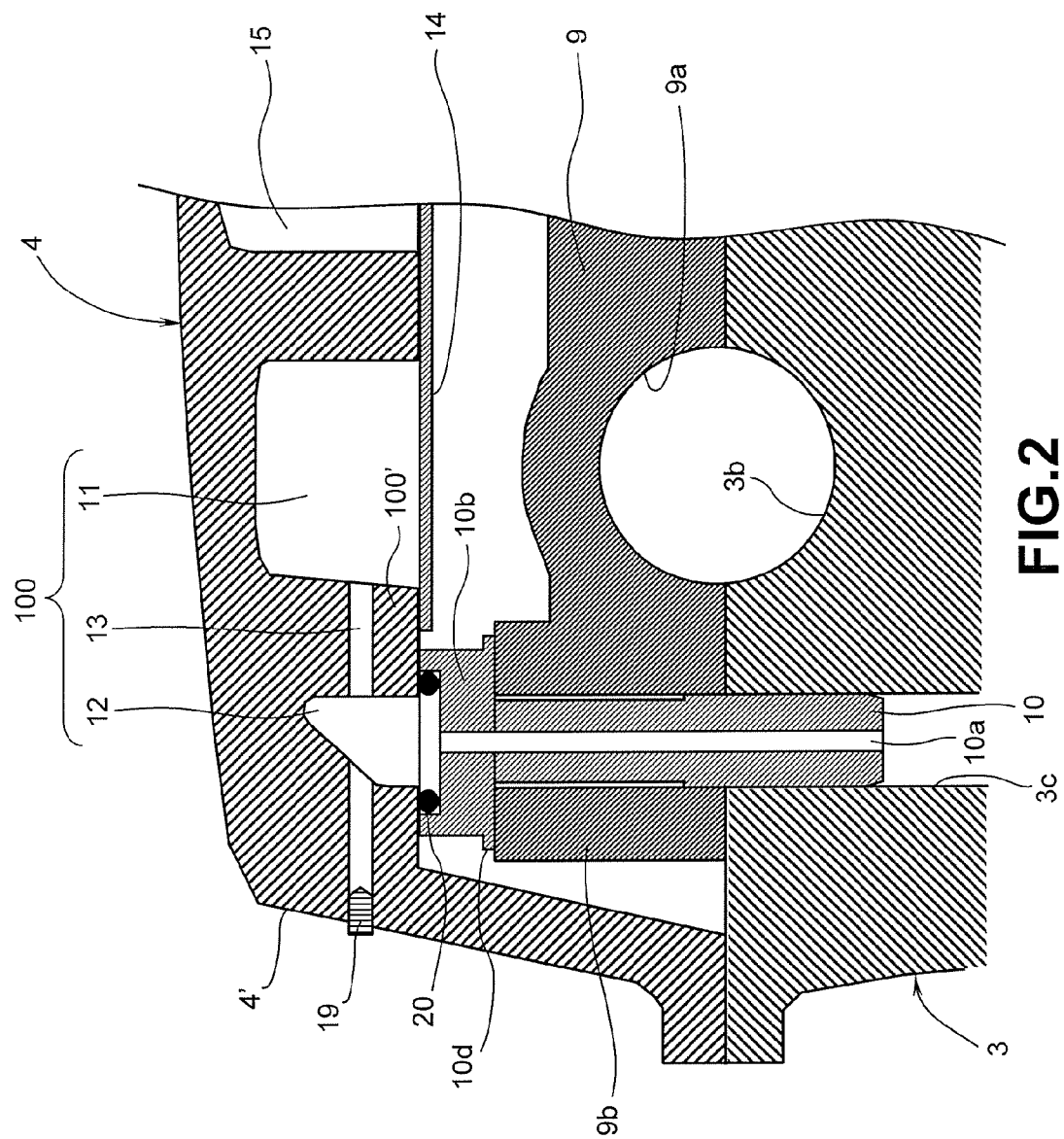
FIG. 2 is an enlarged partial vertical cross sectional view of the engine including the blow-by gas recirculation structure in accordance with the first embodiment of the present invention.
Figure 3:
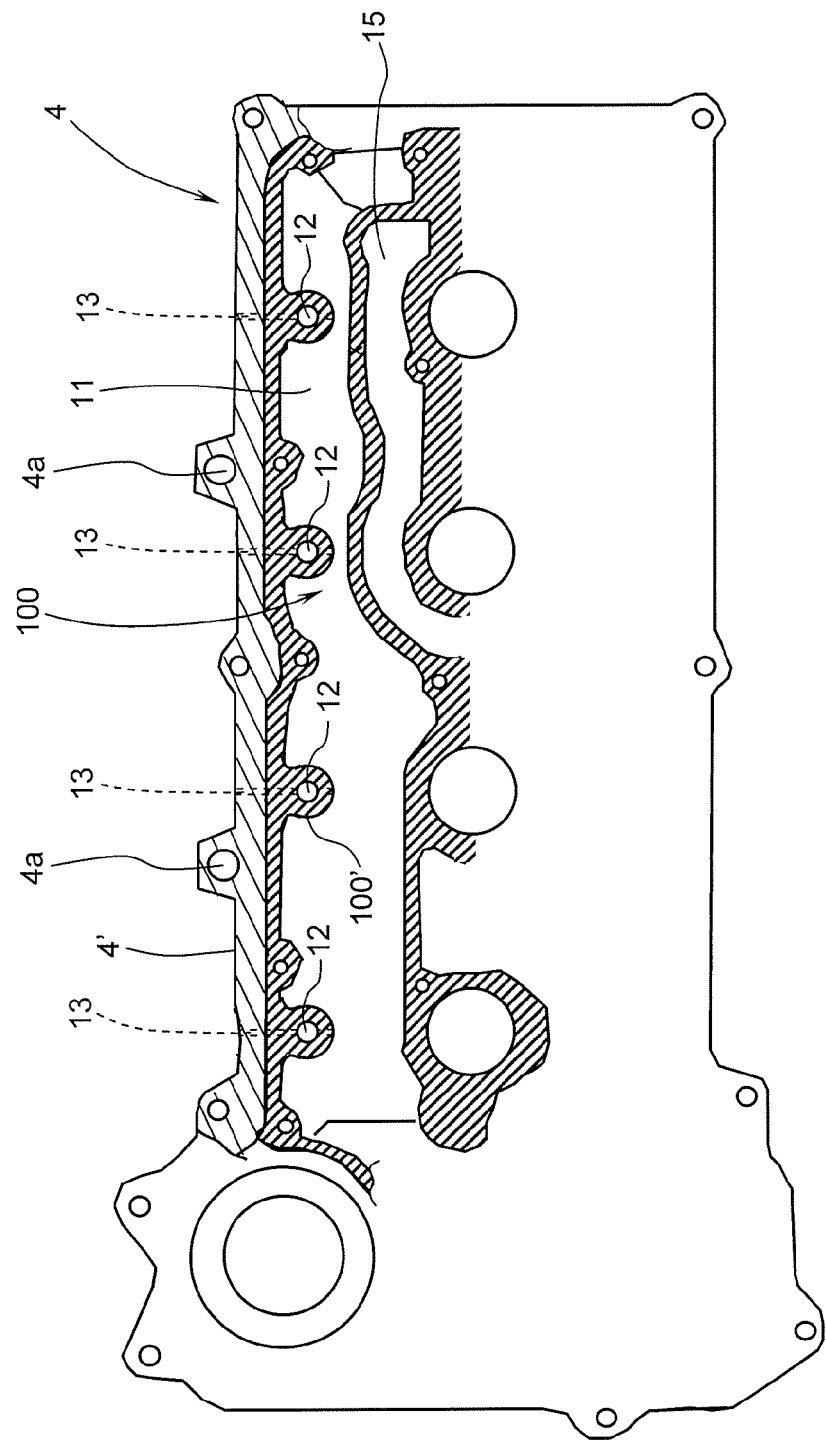
FIG. 3 is a schematic view of an inside of a cylinder head cover of the engine including the blow-by gas recirculation structure in accordance with the first embodiment of the present invention.

Referring initially to FIGS. 1 to 3, an internal combustion engine 1 including a blow-by gas recirculation structure is illustrated in accordance with a first embodiment of the present invention. FIG. 1 is a partial vertical cross sectional view showing main components of the blow-by gas recirculation structure of the engine 1. FIG. 2 is an enlarged partial vertical cross sectional view of the main components shown in FIG. 1. FIG. 3 is schematic view of the inside of a cylinder head cover 4 of the engine 1.

As shown in FIG. 1, the engine 1 includes a cylinder block 2, a cylinder head 3, and the cylinder head cover 4 provided on an upper surface of the cylinder head 3. The cylinder block 2 includes a plurality of cylinder bores 2a (only one cylinder bore 2a is shown in FIG. 1) defining a plurality of cylinders. A piston 5 is arranged in each of the cylinder bores 2a. The cylinder head 3 forms a plurality of intake ports 3a (only one intake port 3a is shown in FIG. 1) disposed above the piston 5. A mounting flange 16a of an intake manifold 16 is mounted to an outside of the intake port 3a of the cylinder head 3 such that the intake manifold 16 and the intake port 3a communicate with each other. An intake valve 6 is provided in each of the intake ports 3a to open and close the intake port 3a. The intake valve 6 is operatively coupled to a cam 8 provided on a camshaft 7 so that the intake valve 6 performs the open and close operation in response to rotation of the cam 8 of the camshaft 7. An upper surface of the cylinder head 3 includes a plurality of shaft bearing portions 3b (only one shaft bearing portion 3b is shown in FIG. 2). A plurality of cam brackets 9 (support members) (only one cam bracket 9 is shown in FIG. 1) is fastened to the upper surface of the cylinder head 3 with a plurality of mounting bolts 10 and 10'. Each of the cam brackets 9 includes a shaft bearing portion 9a. The camshaft 7 is rotatably supported by the shaft bearing portions 3b formed on the upper surface of the cylinder head 3 and the shaft bearing portions 9a of the cam brackets 9.

A baffle plate 14 is provided on the cylinder head cover 4. As shown in FIGS. 2 and 3, the cylinder head cover 4 and the baffle plate 14 form a fresh air introducing passage 15 and a gas-liquid separating section 100 (a gas-liquid separating passage) inside the cylinder head cover 4. Thus, the cylinder head cover 4 and the baffle plate 14 preferably constitute a gas-liquid separating member with the gas-liquid separating section 100 being defined by the cylinder head cover 4 and the baffle plate 14. The gas-liquid separating section 100 includes a devious or winding blow-by gas main passage 11 (main passage section) though which blow-by gas flows and a plurality of distribution sections 12 that are separated from the blow-by gas main passage 11 by a wall section 100'. A communication connection is established between the blow-by gas main passage 11 and each of the distribution sections 12 by a through hole 13 formed in the wall section 100' as shown in FIGS. 1 to 3.

The number of distribution sections 12 preferably corresponds to the number of intake ports 3a. In the first embodiment, the through holes 13 are arranged as horizontal holes that are made with a drill or the like to extend from an outside wall 4' of the cylinder head cover 4 toward the inside of the cylinder head cover 4. The opening of each of the through holes 13 at the outside wall 4' is sealed with a plug 19 as shown in FIG. 2.

The cylinder head cover 4 is fastened onto the cylinder head 3 with a plurality of bolts B (only one bolt B is shown in FIG. 1) passing through a plurality of bolt boss portions 4a (only one bolt boss portion 4a is shown in FIG. 1) formed on an outside periphery of the cylinder head cover 4. As shown in FIG. 1, the engine 1 is also coupled to a fuel pipe 17 and a protective cover 18 that protects the fuel pipe 17.

Figure 4:
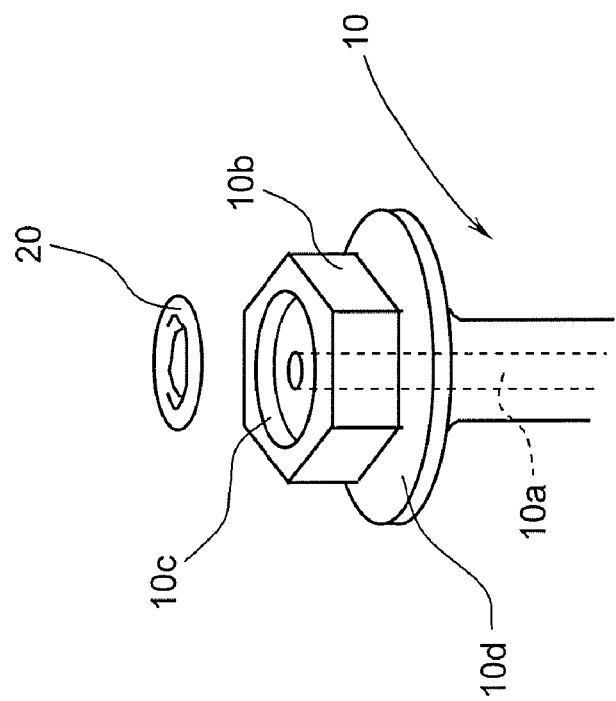
FIG. 4 is a perspective view of a head portion of a mounting bolt used in the blow-by gas recirculation structure in accordance with the first embodiment of the present invention.

The mounting bolts 10 securely fasten the cam brackets 9 to the cylinder head 3 at positions corresponding to the distribution sections 12 of the cylinder head cover 4. On the other hand, the mounting bolts 10' securely fasten the cam brackets 9 to the cylinder head 3 at positions other than the positions corresponding to the distribution sections 12 of the cylinder head cover 4. As shown in FIG. 2, each of the mounting bolts 10 has an axial through hole 10a formed to extend axially there-through. As shown in FIG. 4, a head portion 10b on an upper end of the mounting bolt 10 has a hexagonal periphery shape, and a recessed portion 10c is formed in the top face of the head portion 10b. The recessed portion 10c is configured and arranged such that an O-ring 20 can be inserted therein. A larger-diameter flange portion 10d is formed integrally around a bottom edge of the head portion 10b as shown in FIG. 4.

A plurality of communication passages 3c (only one communication passage 3c is shown in FIG. 1) is formed generally vertically in the cylinder head 3 so that the bottom end of each of the communication passages 3c communicates with the corresponding intake port 3a as shown in FIG. 1. Each of the communication passages 3c is provided with internal threads so that the mounting bolt 10 threadedly engages the internal threads of the communication passage 3c.

When the cam brackets 9 are mounted to the cylinder head 3 with the mounting bolts 10 and 10', and the cylinder head cover 4 is mounted onto the upper surface of the cylinder head 3 with the bolts B, the upper surface of the head portion 10b of the mounting bolt 10 abuts against an outer periphery of a bottom surface of the distribution section 12 of the cylinder head cover 4 as shown in FIG. 2. The O-ring 20 disposed in the recessed portion 10c of the head portion 10b ensures that the connection between the mounting bolt 10 and the cylinder head cover 4 is airtight. The flange portion 10d of the mounting bolt 10 abuts against a bolt boss portion 9b of the cam bracket 9 when the mounting bolt 10 is installed as shown in FIG. 2.

With the blow-by gas recirculation structure described above, oil contained in blow-by gas that flows out from a gap between the cylinder bore 2a and the piston 5 is delivered to the gas-liquid separating section 100 formed in the cylinder head cover 4 in a conventional manner. Then, the oil is separated from the blow-by gas as the blow-by gas flows through the blow-by gas main passage 11 of the gas-liquid separating section 100. The blow-by gas from which the oil has been separated then passes through the through holes 13 into the space inside the distribution sections 12 and is circulated to the intake ports 3a via the axial through holes 10a of the mounting bolts 10 and the communication passages 3c.

Thus, by merely using the axial through hole 10a formed in the mounting bolt 10 and the communication passage 3c formed in the cylinder head 3, the blow-by gas can be recirculated to the intake port 3a in a favorable manner and a passage for recirculating blow-by gas can be secured with a simple structure while preventing a size of the engine 1 from increasing.

Additionally, as the blow-by gas passes from the blow-by gas main passage 11, through the through holes 13, and into the distribution sections 12, the oil contained therein is removed to an even greater degree such that the recirculated blow-by gas contains less oil than it would in a structure in which the blow-by gas is introduced directly into the axial through holes 10a of the mounting bolts 10 from the blow-by gas main passage 11. Also, the structure can be simplified because the distribution sections 12 are arranged closely adjacent to the blow-by gas main passage 11 with the wall section 100' being disposed therebetween and the communication between the blow-by gas main passage 11 and the distribution sections 12 can be accomplished by merely forming the through holes 13.

Thus, with the first embodiment, a blow-by gas recirculation passage can be secured easily by using the axial through hole 10a formed inside the mounting bolt 10 for fastening the cam bracket 9 (which serves to rotatably support the camshaft 7) to the cylinder head 3 and the communication passage 3c formed in the cylinder head 3 as a recirculation passage for blow-by gas.

Figure 5:
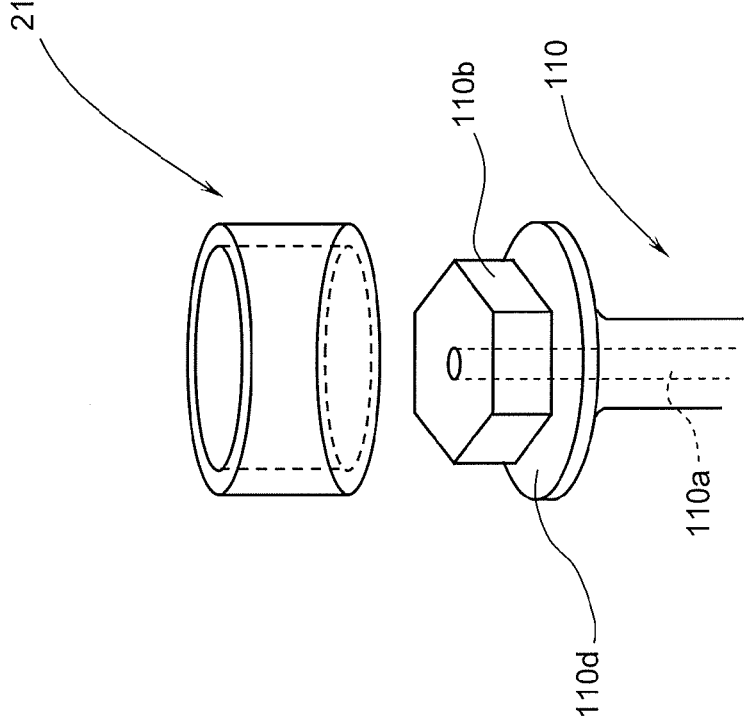
FIG. 5 is a perspective view of a first modified example of the head portion of the mounting bolt used in the blow-by gas recirculation structure in accordance with the first embodiment of the present invention.
Figure 6:
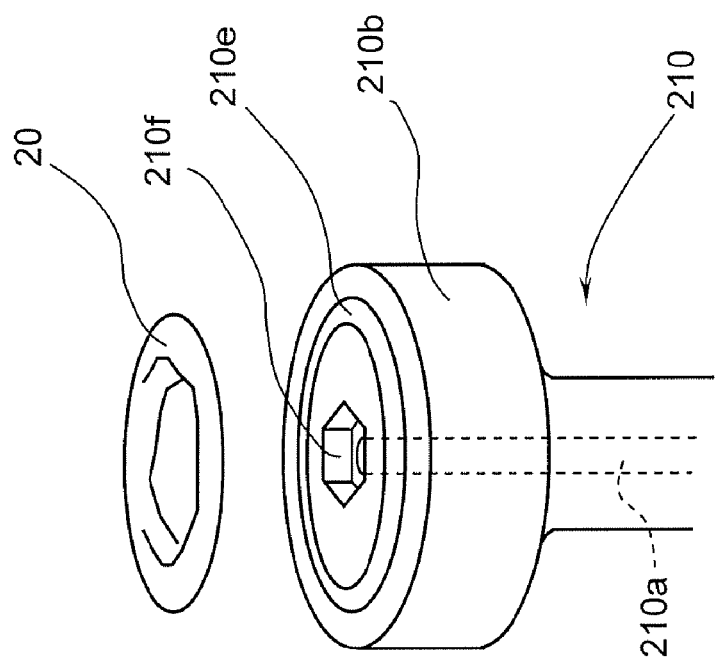
FIG. 6 is a perspective view of a second modified example of the head portion of the mounting bolt used in the blow-by gas recirculation structure in accordance with the first embodiment of the present invention.

Referring now to FIGS. 5 and 6, modified examples of the mounting bolt 10 will be explained in accordance with the first embodiment.

A mounting bolt 110 shown in FIG. 5 has a hexagonal head portion 110b at an upper end thereof and a flange portion 110d that is formed as an integral unit with the head portion 110b. A cylindrical packing 21 configured to fit around the head portion 110b is attached such that the cylindrical packing 21 rests on the flange portion 110d. The upper end of the cylindrical packing 21 is arranged to abut against the outer periphery of the bottom surface of the distribution section 12 of the cylinder head cover 4 to enable an airtight communication between the distribution section 12 and an axial through hole 110a of the mounting bolt 110.

A mounting bolt 210 shown in FIG. 6 has a circular head portion 210b with a ring-shaped O-ring groove 210e formed in an upper end surface of the head portion 210b in a position inward of the outside circumference of the head portion 210b. A hexagonal wrench hole 210f configured to accept a hexagonal wrench is formed inward of the O-ring groove 210e in a central portion of the upper end surface. The mounting bolt 210 can be used with the O-ring 20 inserted into the O-ring groove 210e.

This mounting bolt 210 is configured to be installed into a communication passage 3c of the cylinder head 3 and tightened with a hexagonal wrench tool inserted into the wrench hole 210f. The O-ring 20 inserted into the O-ring groove 210e abuts against the outer periphery of the bottom surface of the distribution section 12 of the cylinder head cover 4 and ensures a good airtight communication between the distribution section 12 and an axial through hole 210a of the mounting bolt 210.

Accordingly, in the blow-by gas recirculation structure in accordance with the first embodiment, the mounting bolt 10 is provided with the axial through hole 10a that passes axially there-through and communicates with the gas-liquid separating section 100. Additionally, the cylinder head 3 has a threaded part arranged for the mounting bolt 10 to be screwed into and the communication passage 3c configured to communicate with the air intake system (the intake ports 3a). The blow-by gas recirculation structure is arranged such that blow-by gas that has passed through the gas-liquid separating section 100 can be recirculated from the axial through hole 10a of the mounting bolt 10 into the air intake system (the intake ports 3a) through the communication passage 3c of the cylinder head 3. Thus, the blow-by gas can be recirculated to the intake ports 3a using only the axial through hole 10a formed in the mounting bolt 10 and the communication passage 3c of the cylinder head 3. As a result, a passage for recirculating blow-by gas can be secured easily.

Moreover, in the blow-by gas recirculation structure in accordance with the first embodiment, a communication connection is established between the axial through hole 10a of the mounting bolt 10 and the gas-liquid separating section 100 by the head portion 10b of the mounting bolt 10 being arranged such that an upper surface of the head portion 10b abuts in an airtight manner against the cylinder head cover 4.

As a result, a passage for recirculating blow-by gas can be secured even more easily because the upper surface of the head portion 10b of the mounting bolt 10 is merely abutted against the cylinder head cover 4 in an airtight manner.

Furthermore, in the blow-by gas recirculation structure in accordance with the first embodiment, the air intake system includes a plurality of air intake passages (the intake ports 3a) corresponding to a number of cylinders, the gas-liquid separating section 100 has the blow-by gas main passage 11 (passage section) arranged for the blow-by gas to flow through and the distribution sections 12 configured and arranged to distribute the blow-by gas to the individual air intake ports 3a, and the axial through hole 10a of the mounting bolt 10 is configured and arranged to communicate with the distribution section 12.

As a result, since the blow-by gas is guided to the axial through hole 10a by the blow-by gas main passage 11 and the distribution section 12, oil contained in the blow-by gas can be removed to a greater degree than in a structure in which the blow-by gas is introduced directly into the axial through hole 10a from the blow-by gas main passage 11.

Moreover, in the blow-by gas recirculation structure in accordance with the first embodiment, the distribution section 12 is arranged closely adjacent to the blow-by gas main passage 11 with the wall section 100' disposed therebetween and the distribution section 12 communicates with the blow-by gas main passage 11 via the through hole 13 that passes through the wall section 100'.

As a result, the communication connection between the distribution section 12 and the blow-by gas main passage 11 can be established by merely forming the through hole 13 in the wall section 100' dividing the distribution section 12 and the blow-by gas main passage 11, and thus, a simple structure can be obtained.

Moreover, in the blow-by gas recirculation structure in accordance with the first embodiment, the gas-liquid separating section 100 is arranged in the cylinder head cover 4.

As a result, it is not necessary to provide a separate gas-liquid separating device as a gas-liquid separating section.

The engine 1 in accordance with the first embodiment is configured and arranged such that blow-by gas that escapes from a gap between the piston 5 and the cylinder bore 2a is recirculated to the air intake system (the intake ports 3*a*) of the engine 1 by the blow-by gas recirculation structure as described above.

Second Embodiment

Referring now to FIGS. 7 to 10, a blow-by gas recirculation structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The blow-by gas recirculation structure of the second embodiment is basically the same as the blow-by gas recirculation structure of the first embodiment explained above, except that the communication between the blow-by gas main passage 11 and the distribution section 12 is accomplished with a cut-out portion 22 formed in the wall section 100' in the second embodiment instead of the through hole 13 as in the first embodiment. The cut-out portion 22 formed in the wall section 100' between the distribution section 12 and the blow-by gas main passage 11 is shown in a top plan view in FIG. 9 and an enlarged perspective view in FIG. 10.

Figure 8:
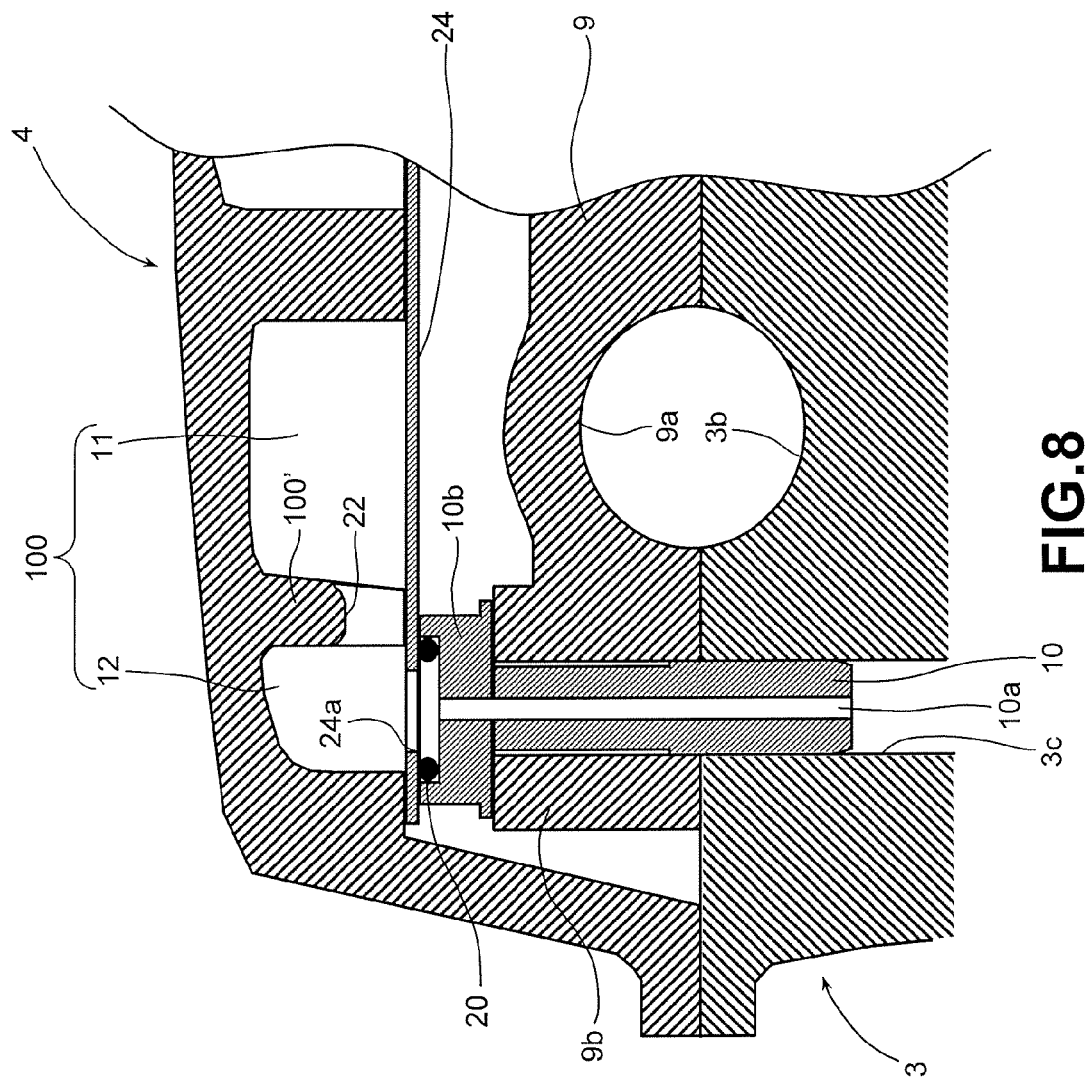
FIG. 8 is an enlarged partial vertical cross sectional view of the engine including the blow-by gas recirculation structure in accordance with the second embodiment of the present invention.
Figure 9:
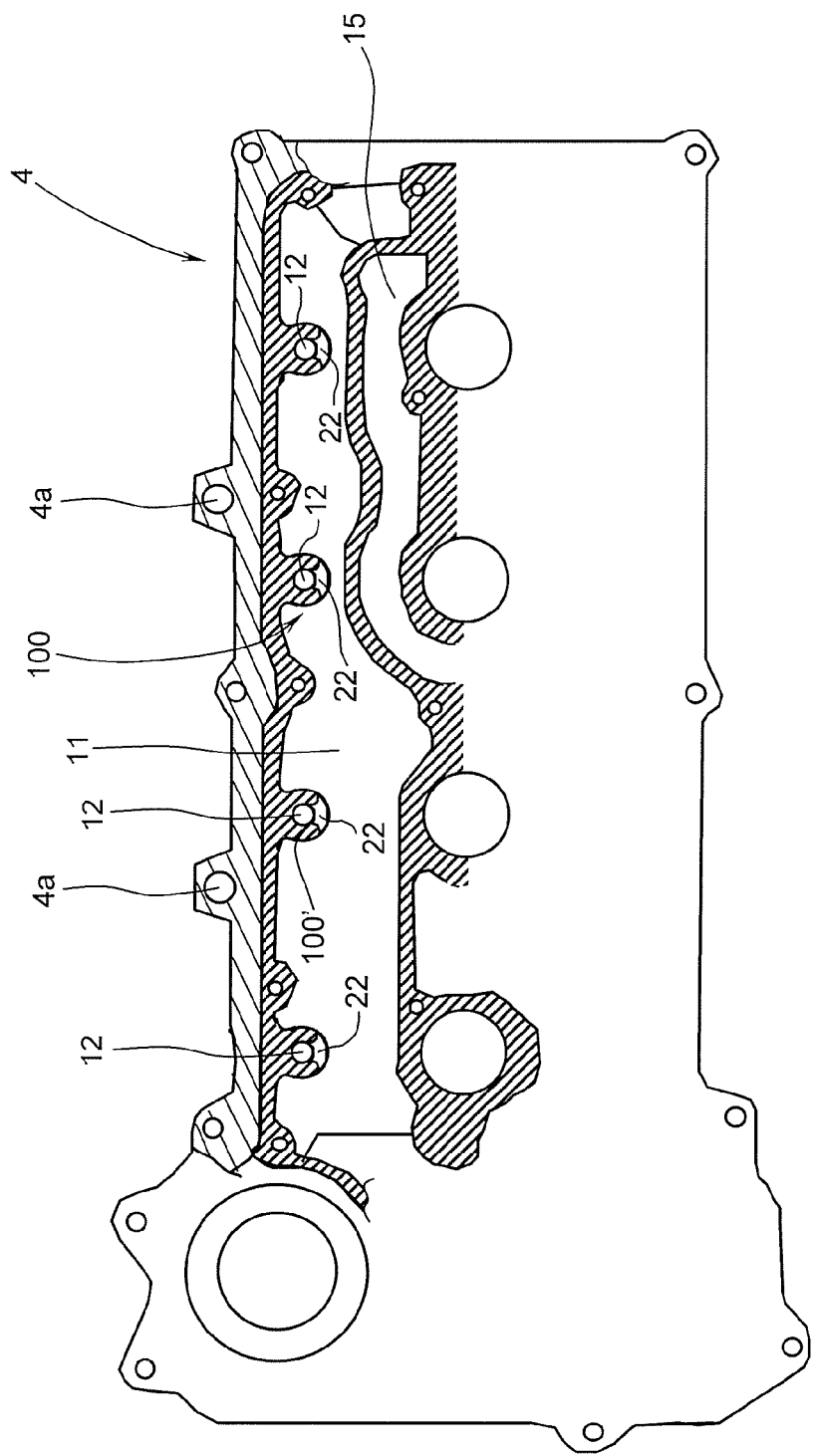
FIG. 9 is a schematic view of an inside of a cylinder head cover of the engine including the blow-by gas recirculation structure in accordance with the second embodiment of the present invention.
Figure 10:
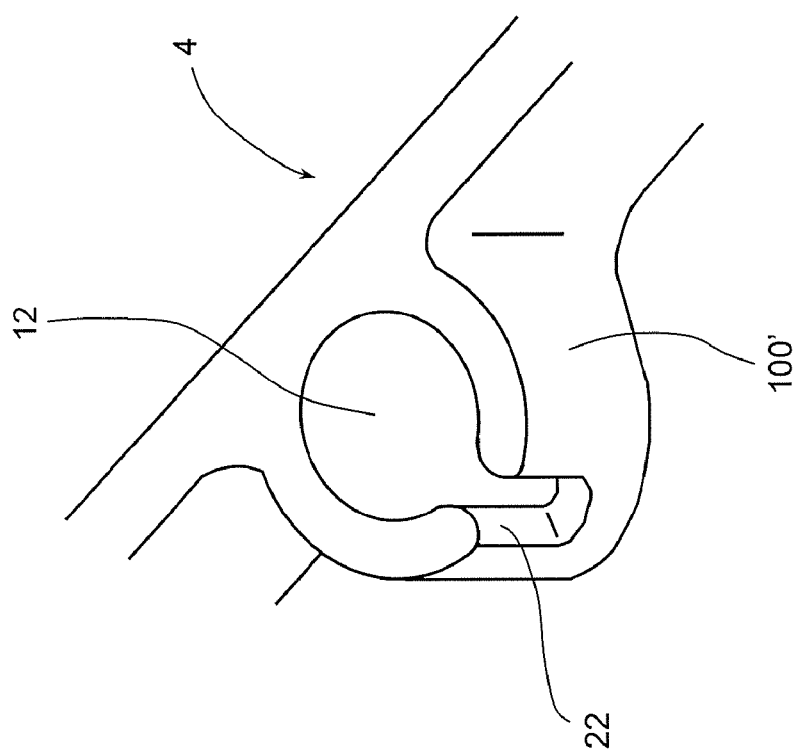
FIG. 10 is an enlarged perspective view of a cut-out portion of a distribution section formed in the cylinder head cover of the engine including the blow-by gas recirculation structure in accordance with the second embodiment of the present invention.

Moreover, in the second embodiment, a baffle plate 24 is provided on a bottom surface of the cylinder head cover 4. As shown in FIG. 8, the baffle plate 24 of the second embodiment extends to the bottom surface of the distribution section 12. A plurality of openings 24*a* (only one opening 24*a* is shown in FIG. 8) is formed in positions of the baffle plate 24 corresponding to the distribution sections 12 and communication between the distribution section 12 and the axial through hole 10*a* of the mounting bolt 10 below is established through the opening 24*a*.

Figure 7:
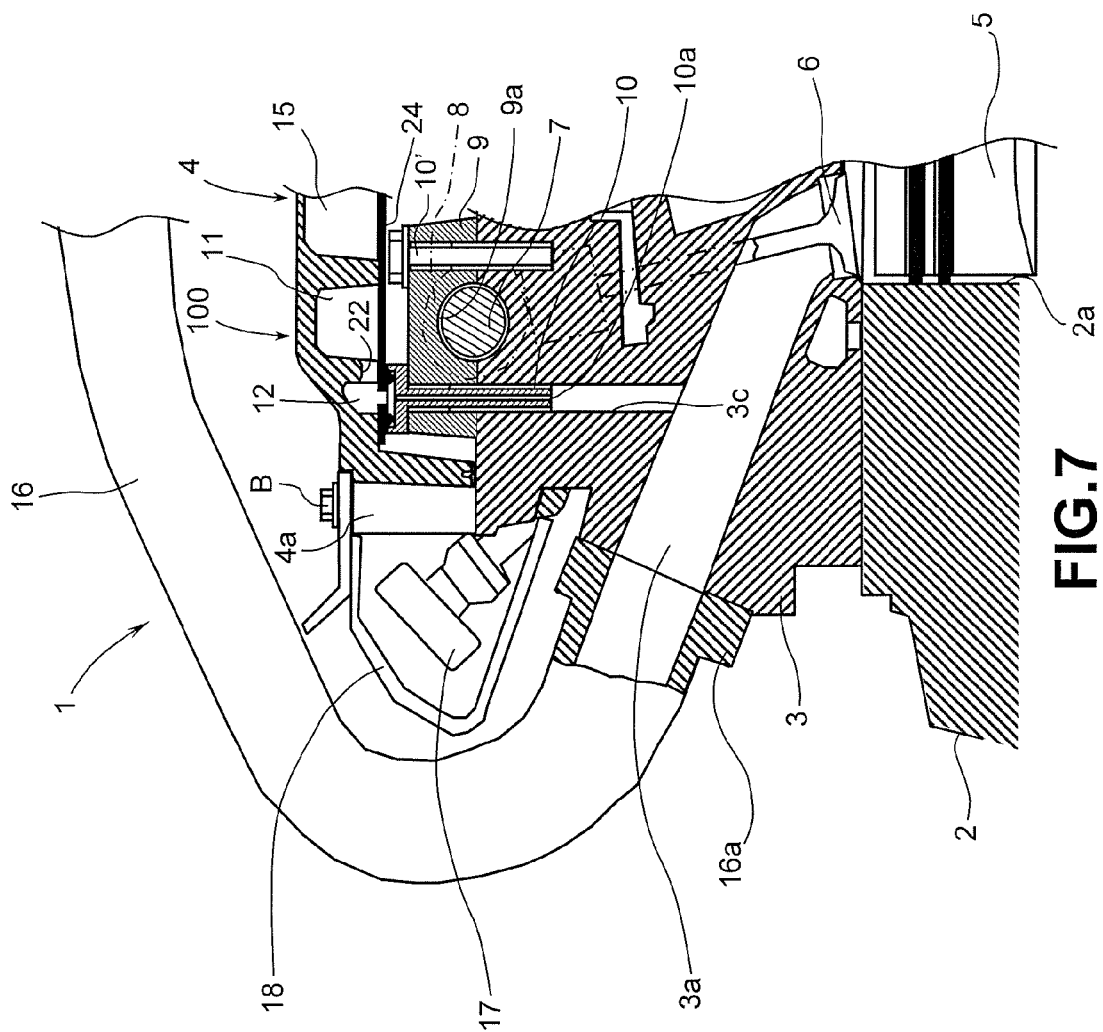
FIG. 7 is a partial vertical cross sectional view of an internal combustion engine including a blow-by gas recirculation structure in accordance with a second embodiment of the present invention.

When the cylinder head 3 and the cylinder head cover 4 are in a mounted state as shown in FIGS. 7 and 8, the O-ring 20 enables the upper surface of the head portion 10*b* of the mounting bolt 10 to abut against an outer periphery of a bottom surface of the opening 24*a* of the baffle plate 24 in an airtight manner.

In the second embodiment, too, the oil contained in blow-by gas that flows out from a gap between the cylinder bore 2*a* and the piston 5 is delivered to the gas-liquid separating section 100 formed in the cylinder head cover 4 in a conventional manner. Then, the oil is separated from the blow-by gas as the blow-by gas flows through the blow-by gas main passage 11 of the gas-liquid separating section 100. The blow-by gas from which the oil has been separated then passes through the cut-out portions 22 and into the space inside the distribution section 12. Then, the blow-by gas is circulated to the intake port 3*a* via the axial through hole 10*a* of the mounting bolt 10 and the communication passage 3*c*. A passage for recirculating blow-by gas can be secured with a simple structure while preventing a size of the engine 1 from increasing. Additionally, a simpler structure can be obtained because the communication between the blow-by gas main passage 11 and the distribution section 12 is accomplished by merely cutting away a portion of the wall section 100' so as to form the cut-out portion 22.

Third Embodiment

Figure 11:
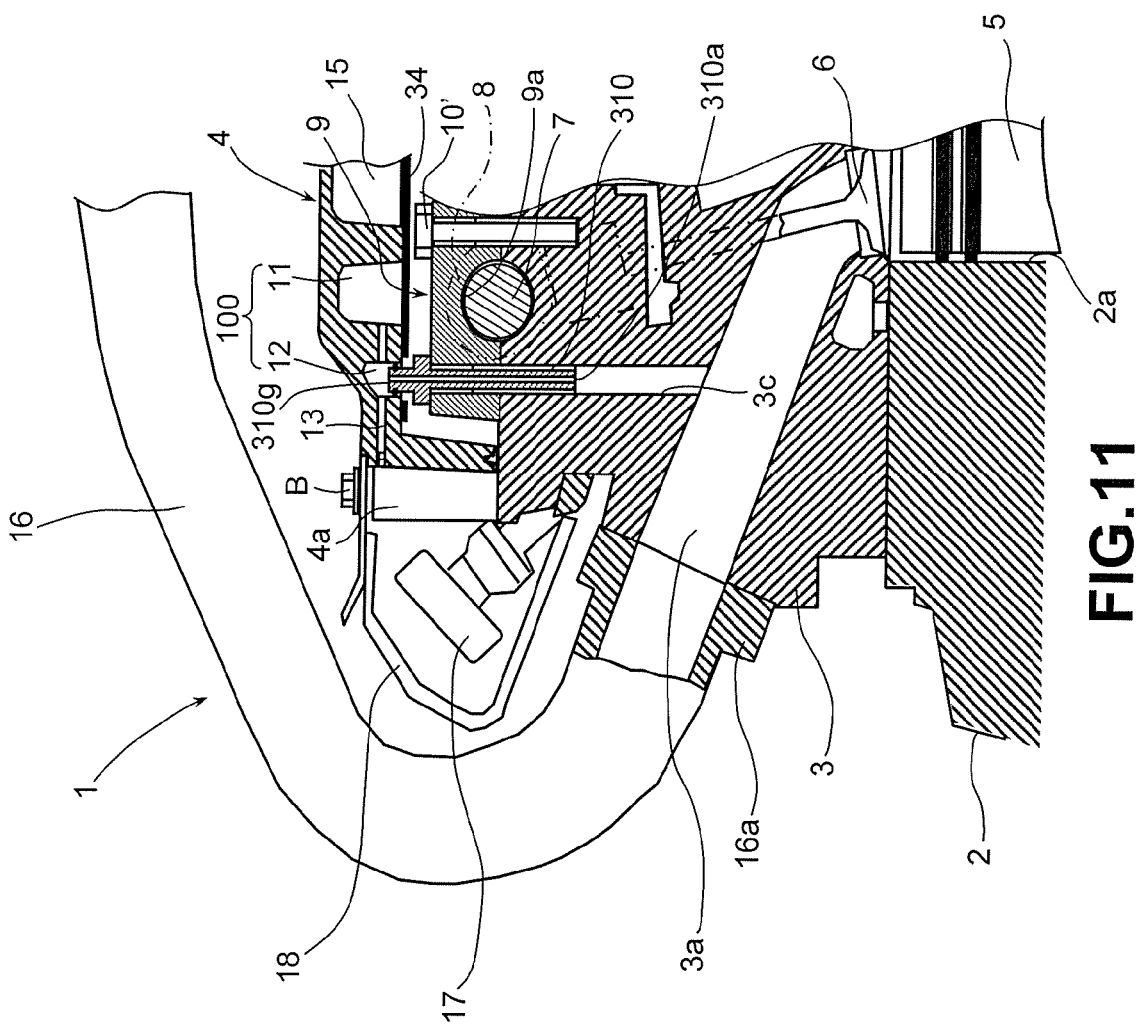
FIG. 11 is a partial vertical cross sectional view of an internal combustion engine including a blow-by gas recirculation structure in accordance with a third embodiment of the present invention.
Figure 12:
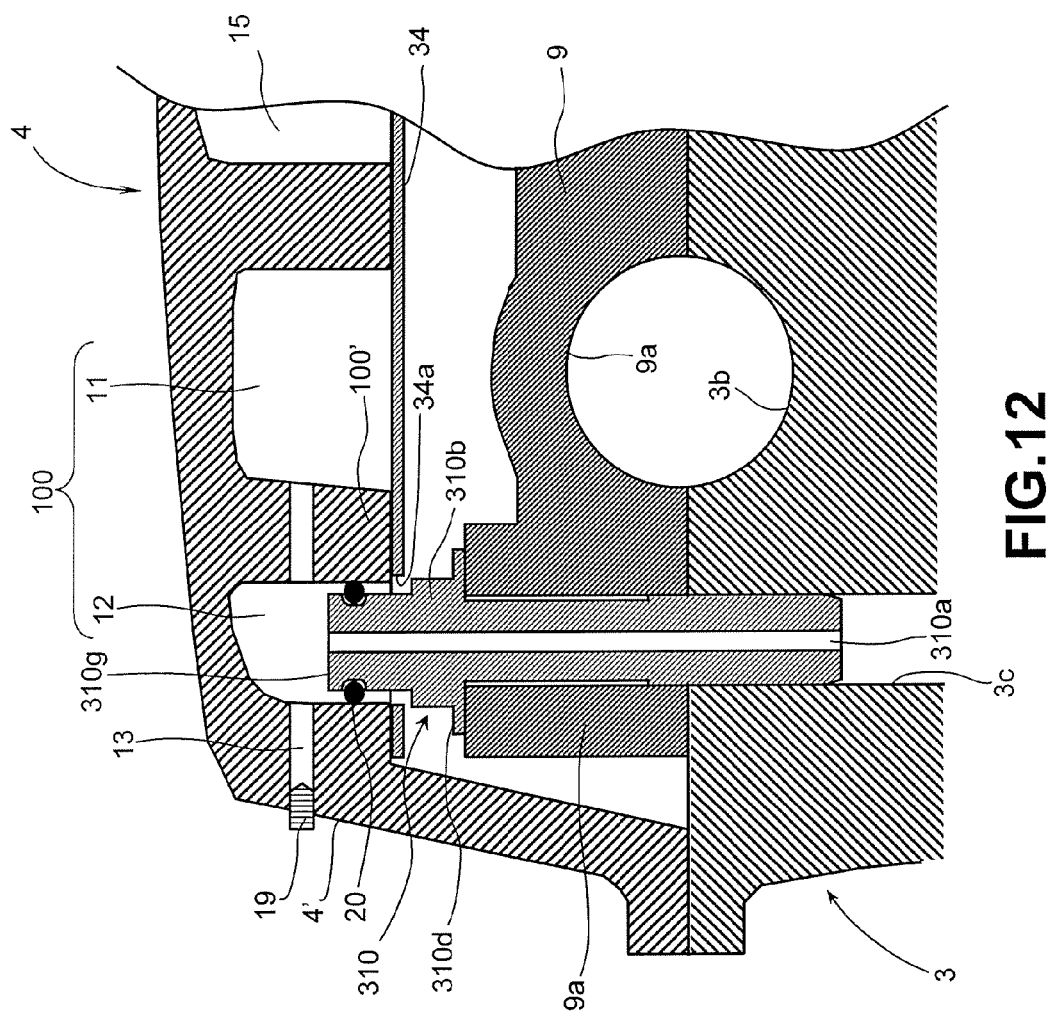
FIG. 12 is an enlarged partial vertical cross sectional view of the engine including the blow-by gas recirculation structure in accordance with the third embodiment of the present invention.

Referring now to FIGS. 11 and 12, a blow-by gas recirculation structure in accordance with a third embodiment will now be explained. In view of the similarity between the third embodiment and the previously explained embodiments, the parts of the third embodiment that are identical to the parts of the previously explained embodiments will be given the same reference numerals as the parts of the previously explained embodiments. Moreover, the descriptions of the parts of the third embodiment that are identical to the parts of the previously explained embodiments may be omitted for the sake of brevity.

The blow-by gas recirculation structure of the third embodiment is basically the same as the blow-by gas recirculation structure of the first embodiment, except that an insertion portion 310*g* of a head portion 310*b* of a mounting bolt 310 is inserted into the space inside the distribution section 12 in an airtight manner to establish a communication between the distribution section 12 and an axial through hole 310*a* of the mounting bolt 310.

As shown in FIG. 12, the axial through hole 310*a* extending in the axial direction is formed in the mounting bolt 310. The mounting bolt 310 includes a head portion 310*b*, a flange portion 310*d* and the insertion portion 310*g*. The flange portion 310*d* is formed near an upper end of the mounting bolt 310 to abut against an upper surface of the bolt boss portion 9*b* of the cam bracket 9 as shown in FIG. 11. The head portion 310*b* is formed above the flange portion 310*d*. An outer periphery of the head portion 310*b* is preferably hexagonal. The insertion portion 310*g* protrudes upward from the head portion 310*b* as shown in FIG. 8. An outside circumferential surface of the insertion portion 310*g* includes a groove arranged to accommodate the O-ring 20.

The insertion portion 310*g* of the mounting bolt 310 is configured and arranged such that when the mounting bolt 310 has been screwed into the communication passage 3*c* of the cylinder head 3 so as to fasten the cam bracket 9 to the cylinder head 3, and the cylinder head cover 4 has been mounted onto the cylinder head 3, the insertion portion 310*g* protrudes into the space inside the distribution section 12. When the insertion portion 310*g* of the mounting bolt 310 is in the inserted state, the O-ring 20 touches against an internal circumference of the distribution section 12 in an airtight manner as shown in FIG. 12. A baffle plate 34 has an opening 34*a* configured and arranged for the insertion portion 310*g* of the mounting bolt 310 to pass through as shown in FIG. 12.

With this embodiment, a blow-by gas recirculation passage can be secured easily by merely inserting the insertion portion 310*g* of the mounting bolt 310 into the space inside the distribution section 12 in an airtight manner.

Fourth Embodiment

Figure 13:
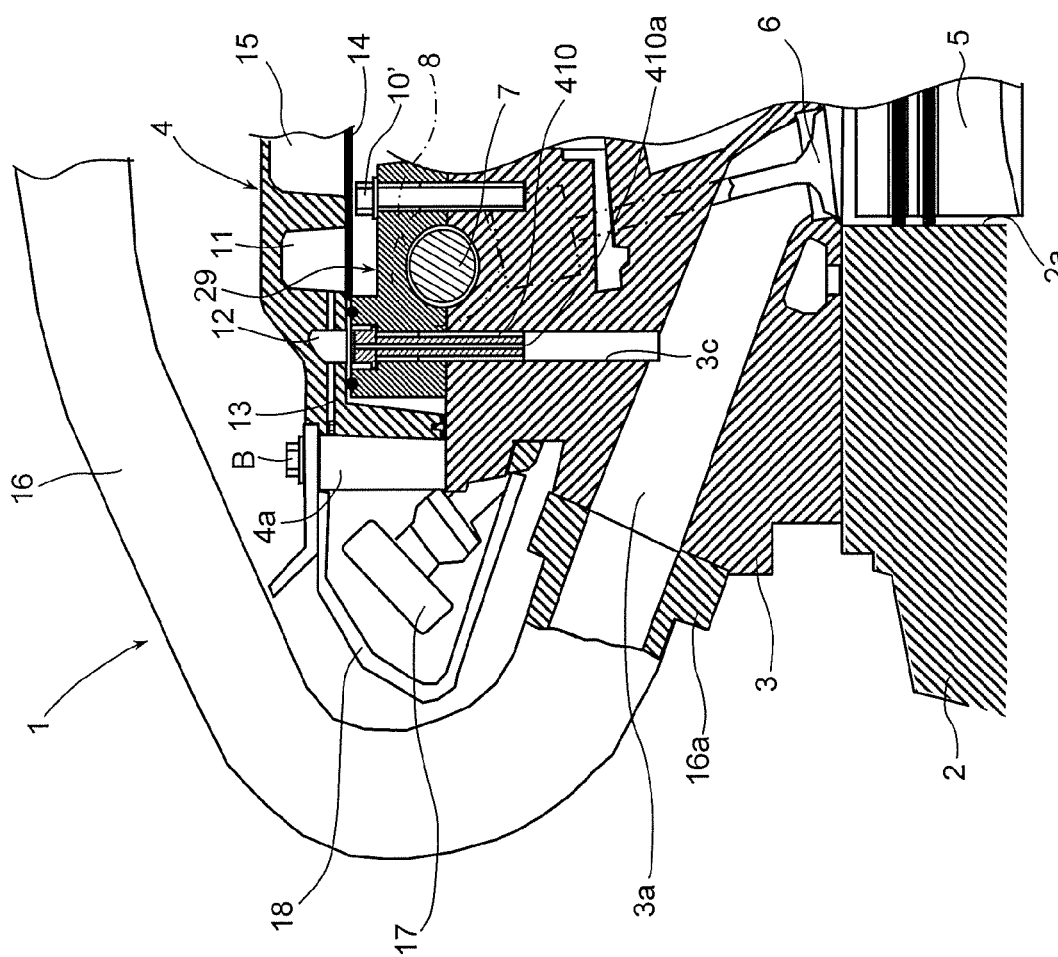
FIG. 13 is a partial vertical cross sectional view of an internal combustion engine including a blow-by gas recirculation structure in accordance with a fourth embodiment of the present invention.
Figure 14:
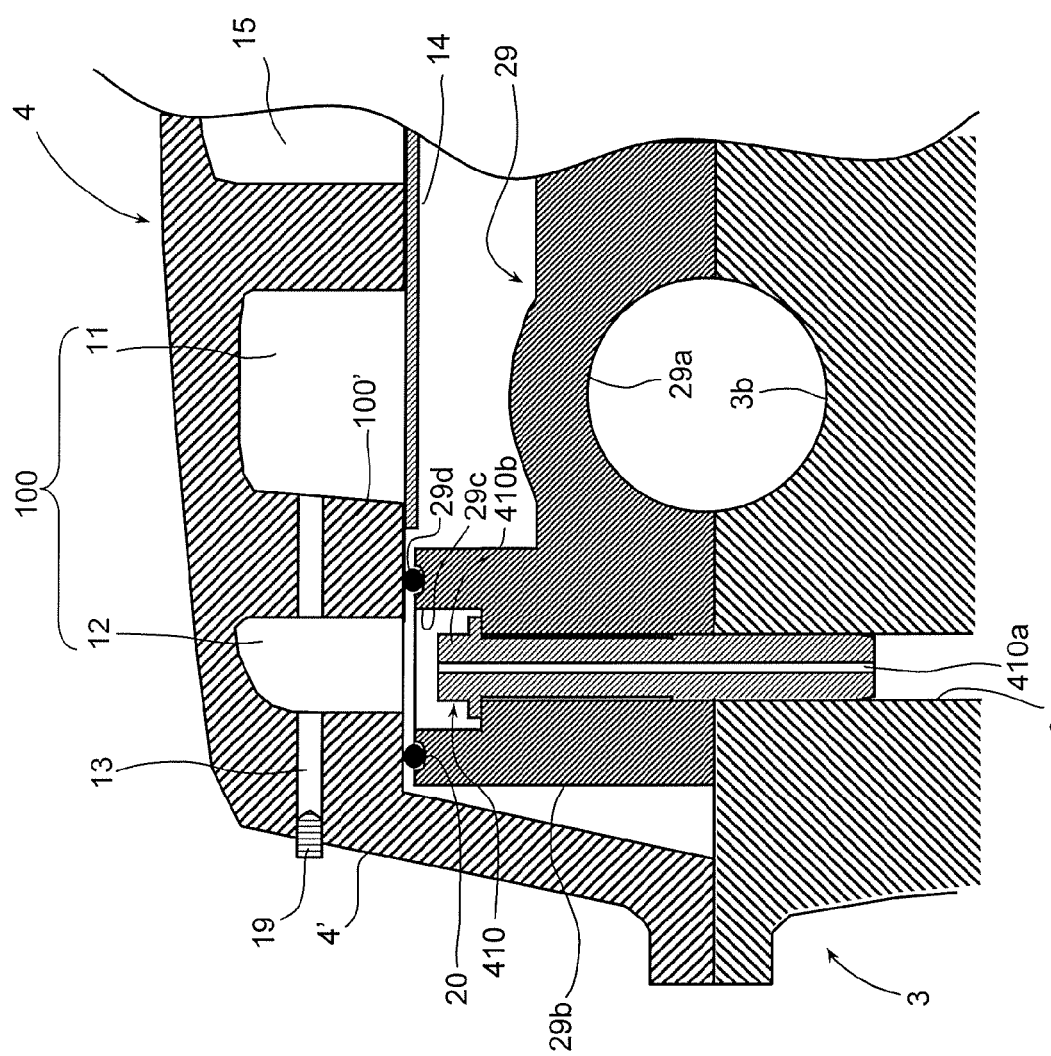
FIG. 14 is an enlarged partial vertical cross sectional view of the engine including the blow-by gas recirculation structure in accordance with the fourth embodiment of the present invention.
Figure 15:
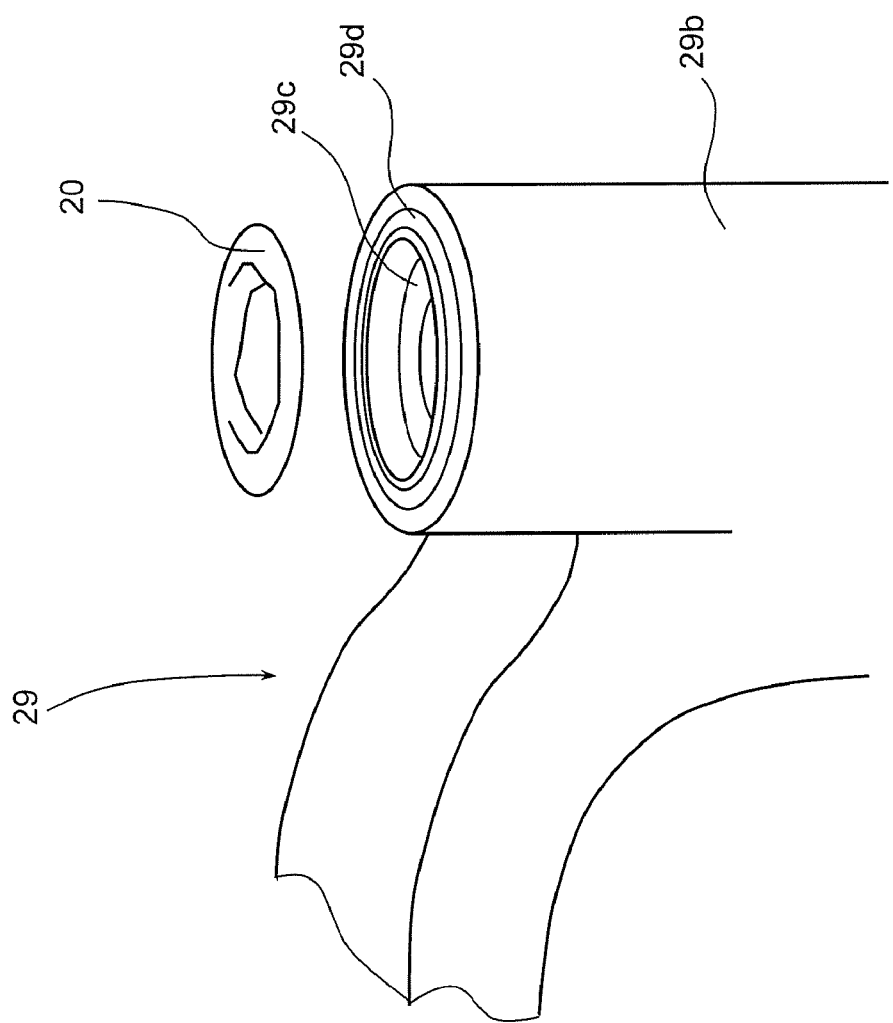
FIG. 15 is an enlarged perspective view of a bolt boss portion of a cam bracket of the blow-by gas recirculation structure in accordance with the fourth embodiment of the present invention.

Referring now to FIGS. 13 to 15, a blow-by gas recirculation structure in accordance with a fourth embodiment will now be explained. In view of the similarity between the fourth embodiment and the previously explained embodiments, the parts of the fourth embodiment that are identical to the parts of the previously explained embodiments will be given the same reference numerals as the parts of the previously explained embodiments. Moreover, the descriptions of the parts of the fourth embodiment that are identical to the parts of the previously explained embodiments may be omitted for the sake of brevity.

The blow-by gas recirculation structure of the fourth embodiment differs from the previously explained embodiments in that a modified structure of a plurality of cam brackets 29 is used, which is fastened to the cylinder head 3 with a plurality of mounting bolts 410 and 10' to rotatably support the camshaft.

FIG. 13 is a partial vertical cross sectional view of the engine 1 including the blow-by gas recirculation structure in accordance with the fourth embodiment. FIG. 14 is an enlarged partial vertical cross sectional view of the engine 1 including the blow-by gas recirculation structure in accordance with the fourth embodiment. FIG. 15 is an enlarged view showing main features of the cam bracket 29. As shown in FIG. 15, the cam bracket 29 includes a bolt boss portion 29b. A recessed portion 29c is formed in a center portion of an upper end of the bolt boss portion 29b as shown in FIG. 15. The recessed portion 29c is configured and arranged to contain or accommodate a head portion 410b of the mounting bolt 410 therein as shown in FIG. 14.

The upper end surface of the bolt boss portion 29b has an O-ring groove 29d disposed around the recessed portion 29c. The recessed O-ring groove 29d is configured and arranged to accommodate the O-ring 20 therein.

As shown in FIG. 14, the mounting bolt 410 is passed through the inside of the recessed portion 29c and screwed into the communication passage 3c of the cylinder head 3 so as to fasten the cam bracket 29 to an upper surface of the cylinder head 3. The cylinder head cover 4 is mounted onto the cylinder head 3 from above and fastened with the bolts B. In this state, the head portion 410b of the mounting bolt 410 is contained inside the recessed portion 29c and the O-ring 20 installed in the O-ring groove 29d formed on the upper end of the bolt boss portion 29b of the cam bracket 29 abuts against an outer periphery of a bottom surface of the distribution section 12 of the cylinder head cover 4 so as to ensure an airtight connection between the distribution section 12 and the bolt boss portion 29b of the cam bracket 29. Therefore, an airtight communication between the distribution section 12 and the axial through hole 410a of the mounting bolt 410 can be accomplished.

The blow-by gas from which the oil has been separated in the blow-by gas main passage 11 passes through the through holes 13 into the distribution section 12 and is circulated from the recessed portion 29c to the intake port 3a via the axial through hole 410a and the communication passage 3c.

With the fourth embodiment, a blow-by gas recirculation passage can be secured easily by merely arranging the structure such that an upper end of the bolt boss portion 29b of the cam bracket 29 abuts in an airtight manner against the distribution section 12 such that communication is established with respect to the distribution section 12.

Although, in the blow-by gas recirculation structures of the first to fourth embodiments described above, the gas-liquid separating section 100 has the blow-by gas main passage 11 and the distribution sections 12, it is acceptable not to include the distribution sections 12. In such a case, the upper surface of the head portion 10b, 110b or 210b of the mounting bolt 10, 110 or 210 in the first or second embodiment, or the upper end of the bolt boss portion 29b of the cam bracket 29 in the fourth embodiment is configured and arranged to employ the O-ring 20 to abut in an airtight manner against a bottom surface of the blow-by gas main passage 11, or the insertion portion 310g of the mounting bolt 310 in the third embodiment is configured to be inserted into the blow-by gas main passage 11 in an airtight manner.

Although, in the blow-by gas recirculation structures of the first to fourth embodiments described above, the gas-liquid separating section 100 includes the blow-by gas main passage 11 and the distribution sections 12 formed in the cylinder head cover 4, it is also acceptable for the gas-liquid separating member having the gas-liquid separating section 100 to be provided as a separate entity from the cylinder head cover 4.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an engine equipped with the present invention. Accordingly, these terms, as utilized to describe the present invention should be interpreted relative to an engine equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A blow-by gas recirculation structure for an engine adapted to recirculate a blow-by gas to an air intake system of the engine, the blow-by gas recirculation structure comprising:
 a gas-liquid separating member including a gas-liquid separating passage configured and arranged to separate oil from the blow-by gas;
 a cylinder head configured and arranged to rotatably support a camshaft, the cylinder head including a communication passage communicating with the air intake system;
 a support member configured and arranged to rotatably support the camshaft in the cylinder head; and
 a mounting bolt securely fastening the support member to the cylinder head with the mounting bolt threadedly engaging within the communication passage of the cylinder head, the mounting bolt having an axial through hole axially extending there-through and communicating with the gas-liquid separating passage so that the blow-by gas that has passed through the gas-liquid separating passage is recirculated from the axial through hole of the mounting bolt, through the communication passage, and into the air intake system.

2. The blow-by gas recirculation structure recited in claim 1, wherein
the mounting bolt has a head portion with an upper surface of the head portion abutting against the gas-liquid separating member in an airtight manner to establish a communication connection between the axial through hole of the mounting bolt and the gas-liquid separating passage of the gas-liquid separating member.

3. The blow-by gas recirculation structure recited in claim 1, wherein
the mounting bolt has a head portion inserted into the gas-liquid separating member in an airtight manner to establish a communication connection between the axial through hole of the mounting bolt and the gas-liquid separating passage of the gas-liquid separating member.

4. The blow-by gas recirculation structure recited in claim 1, wherein
the support member includes a bolt boss part forming a recessed portion that accommodates a head portion of the mounting bolt with the bolt boss part abutting against the gas-liquid separating member in an airtight manner to establish a communication connection between the axial through hole of the mounting bolt and the gas-liquid separating passage of the gas-liquid separating member.

5. The blow-by gas recirculation structure recited in claim 1, wherein
the air intake system of the cylinder head has a plurality of air intake ports corresponding to a number of cylinders of the engine,
the gas-liquid separating passage includes a main passage section and a distribution section, the main passage section being configured and arranged for the blow-by gas to flow through and the distribution section being configured and arranged to distribute the blow-by gas in the main passage section into each of the air intake ports, and
the axial through hole of the mounting bolt communicates with the distribution section of the gas-liquid separating passage.

6. The blow-by gas recirculation structure recited in claim 2, wherein
the air intake system of the cylinder head has a plurality of air intake ports corresponding to a number of cylinders of the engine,
the gas-liquid separating passage includes a main passage section and a distribution section, the main passage section being configured and arranged for the blow-by gas to flow through and the distribution section being configured and arranged to distribute the blow-by gas in the main passage section into each of the air intake ports, and
the axial through hole of the mounting bolt communicates with the distribution section of the gas-liquid separating passage.

7. The blow-by gas recirculation structure recited in claim 3, wherein
the air intake system of the cylinder head has a plurality of air intake ports corresponding to a number of cylinders of the engine,
the gas-liquid separating passage includes a main passage section and a distribution section, the main passage section being configured and arranged for the blow-by gas to flow through and the distribution section being configured and arranged to distribute the blow-by gas in the main passage section into each of the air intake ports, and
the axial through hole of the mounting bolt communicates with the distribution section of the gas-liquid separating passage.

8. The blow-by gas recirculation structure recited in claim 4, wherein
the air intake system of the cylinder head has a plurality of air intake ports corresponding to a number of cylinders of the engine,
the gas-liquid separating passage includes a main passage section and a distribution section, the main passage section being configured and arranged for the blow-by gas to flow through and the distribution section being configured and arranged to distribute the blow-by gas in the main passage section into each of the air intake ports, and
the axial through hole of the mounting bolt communicates with the distribution section of the gas-liquid separating passage.

9. The blow-by gas recirculation structure recited in claim 5, wherein
the distribution section is disposed adjacent to the main passage section with a wall section being formed therebetween, and the distribution section communicates with the main passage section via a through hole that passes through the wall section.

10. The blow-by gas recirculation structure recited in claim 5, wherein
the distribution section is disposed adjacent to the passage section with a wall section being formed therebetween, and the distribution section communicates with the passage section via a cut-out portion formed in the wall section.

11. The blow-by gas recirculation structure recited in claim 1, wherein
the gas-liquid separating member includes a cylinder head cover and a baffle plate with the gas-liquid separating passage being defined by the cylinder head cover and the baffle plate.

12. The blow-by gas recirculation structure recited in claim 11, wherein
the mounting bolt has a head portion with an upper surface of the head portion abutting against the gas-liquid separating member in an airtight manner to establish a communication connection between the axial through hole of the mounting bolt and the gas-liquid separating passage of the gas-liquid separating member.

13. The blow-by gas recirculation structure recited in claim 11, wherein
the mounting bolt has a head portion inserted into the gas-liquid separating member in an airtight manner to establish a communication connection between the axial through hole and the gas-liquid separating passage.

14. The blow-by gas recirculation structure recited in claim 11, wherein
the support member includes a bolt boss part forming a recessed portion that accommodates a head portion of the mounting bolt with the bolt boss part abutting against the gas-liquid separating member in an airtight manner to establish a communication connection between the axial through hole of the mounting bolt and the gas-liquid separating passage.

15. The blow-by gas recirculation structure recited in claim 11, wherein the air intake system of the cylinder head has a plurality of air intake ports corresponding to a number of cylinders of the engine, the gas-liquid separating passage includes a main passage section and a distribution section, the main passage section being configured and arranged for the blow-by gas to flow through and the distribution section being configured and arranged to distribute the blow-by gas in the main passage section into each of the air intake ports, and the axial through hole of the mounting bolt communicates with the distribution section of the gas-liquid separating passage.

16. The blow-by gas recirculation structure recited in claim 15, wherein the distribution section is disposed adjacent to the main passage section with a wall section being formed therebetween, and the distribution section communicates with the main passage section via a through hole that passes through the wall section.

17. The blow-by gas recirculation structure recited in claim 15, wherein the distribution section is disposed adjacent to the passage section with a wall section being formed therebetween, and the distribution section communicates with the passage section via a cut-out portion formed in the wall section.

18. An internal combustion engine having the blow-by gas recirculation structure recited in claim 1, wherein the internal combustion engine includes a cylinder bore and a piston slidably disposed in the cylinder bore with the blow-by gas recirculation structure arranged to recirculate blow-by gas that escaped from a gap between the piston and the cylinder bore to the air intake system.

\* \* \* \* \*